(12) United States Patent
Zalenski et al.

(10) Patent No.: US 7,957,401 B2
(45) Date of Patent: Jun. 7, 2011

(54) SYSTEM AND METHOD FOR USING MULTIPLE COMMUNICATION PROTOCOLS IN MEMORY LIMITED PROCESSORS

(75) Inventors: Anthony Zalenski, Boca Raton, FL (US); Albert Papp, III, Mountain View, CA (US); John M. Cooney, San Carlos, CA (US); Andre Milota, Oakland, CA (US); Darius Fredrick Mostaufi, San Carlos, CA (US)

(73) Assignee: GEOS Communications, Inc., Southlake, TX (US)

( * ) Notice: Subject to any disclaimer, the term of this patent is extended or adjusted under 35 U.S.C. 154(b) by 1497 days.

(21) Appl. No.: 10/613,656

(22) Filed: Jul. 3, 2003
(Under 37 CFR 1.47)

(65) Prior Publication Data
US 2004/0205777 A1 Oct. 14, 2004

Related U.S. Application Data

(60) Provisional application No. 60/394,207, filed on Jul. 5, 2002.

(51) Int. Cl.
*H04L 12/28* (2006.01)
*H04L 12/56* (2006.01)
(52) U.S. Cl. .................................................. 370/401
(58) Field of Classification Search .................. 370/401
See application file for complete search history.

(56) References Cited

U.S. PATENT DOCUMENTS

| | | | |
|---|---|---|---|
| 5,402,481 A | 3/1995 | Waldman | |
| 5,809,128 A | 9/1998 | McMullin | |
| 5,987,103 A | 11/1999 | Martino | |
| 6,014,440 A | 1/2000 | Melkild et al. | |
| 6,091,732 A | 7/2000 | Alexander, Jr. et al. | |
| 6,104,757 A | 8/2000 | Rhee | |
| 6,118,768 A | 9/2000 | Bhatia et al. | |
| 6,125,113 A | 9/2000 | Farris et al. | |
| 6,141,345 A | 10/2000 | Goeddel et al. | |
| 6,185,288 B1 | 2/2001 | Wong | |
| 6,256,778 B1 | 7/2001 | Oliver | |
| 6,307,853 B1 | 10/2001 | Storch et al. | |
| 6,351,464 B1 | 2/2002 | Galvin et al. | |
| 6,351,730 B2 | 2/2002 | Chen | |
| 6,359,880 B1 | 3/2002 | Curry et al. | |
| 6,389,005 B1 | 5/2002 | Cruickshank | |
| 6,434,139 B1 | 8/2002 | Liu et al. | |
| 6,445,694 B1 | 9/2002 | Swartz | |
| 6,449,251 B1 | 9/2002 | Awadallah et al. | |

(Continued)

OTHER PUBLICATIONS

U.S. Appl. No. 10/969,516, entitled "Portable VoIP Service Access Module," filed on Oct. 20, 2004, by Barkley et al.

(Continued)

*Primary Examiner* — Alexander Jamal
(74) *Attorney, Agent, or Firm* — Toler Law Group, IP

(57) ABSTRACT

A system and method for implementing large and/or multiple telecommunication protocols utilizing memory-limited processors. Telecommunication protocols are expressed as virtual machine instructions defining a finite state machine. A telecommunication protocol engine implements the telecommunication protocols using a virtual machine operating under the control of a CPU. A telephony gateway comprising a telecommunication protocol engine interfaces with a communication device and a packet switched network. A network of telephony gateways communicating with a provider gateway facilitates communication over a packet switched network. A call placed by a calling telephony gateway to a receiving device on the same network or another network is routed according to a prefix in a telephone code sent by the calling telephony gateway.

26 Claims, 10 Drawing Sheets

U.S. PATENT DOCUMENTS

| | | | |
|---|---|---|---|
| 6,496,477 B1 | 12/2002 | Perkins et al. | |
| 6,542,497 B1 | 4/2003 | Curry et al. | |
| 6,597,686 B1 | 7/2003 | Smyk | |
| 6,603,774 B1 | 8/2003 | Knappe et al. | |
| 6,618,761 B2 | 9/2003 | Munger et al. | |
| 6,636,504 B1 | 10/2003 | Albers et al. | |
| 6,658,496 B1 | 12/2003 | Minakata et al. | |
| 6,700,956 B2 | 3/2004 | Chang et al. | |
| 6,760,324 B1 | 7/2004 | Scott et al. | |
| 6,763,226 B1 | 7/2004 | McZeal, Jr. | |
| 6,771,594 B1 | 8/2004 | Upadrasta | |
| 6,788,769 B1 | 9/2004 | Waites | |
| 6,795,540 B1 | 9/2004 | Mow | |
| 6,822,957 B1 | 11/2004 | Schuster et al. | |
| 6,826,174 B1 | 11/2004 | Erekson et al. | |
| 6,856,612 B1 | 2/2005 | Bjelland et al. | |
| 6,895,000 B2 | 5/2005 | Lai et al. | |
| 6,907,031 B1 | 6/2005 | Ehlinger et al. | |
| 6,947,417 B2 | 9/2005 | Laursen et al. | |
| 6,954,454 B1 | 10/2005 | Schuster et al. | |
| 7,012,888 B2 | 3/2006 | Schoeneberger et al. | |
| 7,016,481 B2 | 3/2006 | McElvaney | |
| 7,042,841 B2 | 5/2006 | Abdelilah et al. | |
| 7,046,683 B1 | 5/2006 | Zhao | |
| 7,092,380 B1 | 8/2006 | Chen et al. | |
| 7,113,500 B1 | 9/2006 | Bollinger et al. | |
| 7,145,900 B2 | 12/2006 | Nix et al. | |
| 7,212,622 B2 | 5/2007 | Delaney et | |
| 7,213,766 B2 | 5/2007 | Ryan et al. | |
| 7,227,938 B2 | 6/2007 | Rodman et al. | |
| 7,283,542 B2 | 10/2007 | Mitchell | |
| 7,302,053 B2 | 11/2007 | Chang et al. | |
| 2001/0038033 A1 | 11/2001 | Habib | |
| 2002/0052965 A1 | 5/2002 | Dowling | |
| 2002/0097843 A1 | 7/2002 | Krol et al. | |
| 2002/0131604 A1 | 9/2002 | Amine | |
| 2002/0147912 A1 | 10/2002 | Shmueli et al. | |
| 2002/0184376 A1 | 12/2002 | Sternagle | |
| 2002/0191621 A1 | 12/2002 | Jha | |
| 2002/0191768 A1 | 12/2002 | Stoughton | |
| 2003/0002479 A1 | 1/2003 | Vortman et al. | |
| 2003/0023669 A1 | 1/2003 | DeLima et al. | |
| 2003/0093606 A1 | 5/2003 | Mambakkam et al. | |
| 2003/0110257 A1 | 6/2003 | Hyun et al. | |
| 2003/0112820 A1 | 6/2003 | Beach | |
| 2003/0123388 A1 | 7/2003 | Bradd | |
| 2003/0161453 A1 | 8/2003 | Veschi | |
| 2003/0204619 A1 | 10/2003 | Bays | |
| 2003/0214939 A1 | 11/2003 | Eldumiati et al. | |
| 2003/0219006 A1 | 11/2003 | Har | |
| 2004/0017794 A1* | 1/2004 | Trachewsky | 370/338 |
| 2004/0019539 A1 | 1/2004 | Raman et al. | |
| 2004/0032860 A1 | 2/2004 | Mundra et al. | |
| 2004/0032862 A1 | 2/2004 | Schoeneberger et al. | |
| 2004/0047451 A1 | 3/2004 | Barker et al. | |
| 2004/0086093 A1 | 5/2004 | Schranz | |
| 2004/0114581 A1 | 6/2004 | Hans et al. | |
| 2004/0133668 A1 | 7/2004 | Nicholas, III | |
| 2004/0141508 A1 | 7/2004 | Schoeneberger et al. | |
| 2004/0141758 A1 | 7/2004 | El-Reedy | |
| 2004/0165578 A1 | 8/2004 | Burritt et al. | |
| 2004/0205023 A1 | 10/2004 | Hafer et al. | |
| 2004/0218583 A1 | 11/2004 | Adan et al. | |
| 2004/0223458 A1 | 11/2004 | Gentle | |
| 2004/0248590 A1 | 12/2004 | Chan et al. | |
| 2004/0252703 A1* | 12/2004 | Bullman et al. | 370/395.52 |
| 2004/0258003 A1 | 12/2004 | Kokot et al. | |
| 2005/0002506 A1 | 1/2005 | Bender et al. | |
| 2005/0074031 A1 | 4/2005 | Sunstrum | |
| 2005/0074122 A1 | 4/2005 | Fascenda | |
| 2005/0089052 A1 | 4/2005 | Chen et al. | |
| 2005/0091392 A1 | 4/2005 | Gesswein et al. | |
| 2005/0094621 A1 | 5/2005 | Acharya et al. | |
| 2005/0138183 A1 | 6/2005 | O'Rourke et al. | |
| 2005/0180464 A1 | 8/2005 | McConnell et al. | |
| 2005/0195799 A1 | 9/2005 | Burne et al. | |
| 2005/0201414 A1 | 9/2005 | Awais | |
| 2005/0220083 A1 | 10/2005 | Takeuchi | |
| 2005/0243733 A1 | 11/2005 | Crawford et al. | |
| 2006/0008059 A1 | 1/2006 | Ying et al. | |
| 2006/0029062 A1 | 2/2006 | Rao et al. | |
| 2006/0029063 A1 | 2/2006 | Rao et al. | |
| 2006/0031393 A1 | 2/2006 | Cooney et al. | |
| 2006/0034296 A1 | 2/2006 | Talucci | |
| 2006/0037071 A1 | 2/2006 | Rao et al. | |
| 2006/0039356 A1 | 2/2006 | Rao et al. | |
| 2006/0088025 A1 | 4/2006 | Barkley et al. | |
| 2006/0208066 A1 | 9/2006 | Finn et al. | |
| 2006/0276230 A1 | 12/2006 | McConnell | |
| 2007/0248081 A1 | 10/2007 | Barkley et al. | |
| 2008/0025291 A1 | 1/2008 | Barkley et al. | |

OTHER PUBLICATIONS

"Pocki Phone VoIP Softphone + USB Flash Disk Drive (128M)", www.welltech.com/newsletter/vol_5/20041005.htm, Oct. 5, 2004, 2 pages.

Rosenberg, J. et al., "SIP: Session Initiation Protocol," RFC 3261, Jun. 2002, pp. 1-18.

Rosenberg, J. et al. "Stun—Simple Traversal of User Datagram Protocol (UDP) Through Network Address Translators (NATS)," RFC 3489, Mar. 2003, pp. 1-47.

Schulzrinne, H. "Dynamic Host Configuration Protocol (DHCP-for-IPv4) Option for Session Initiation Protocol (SIP) Servers," RFC 3361, Aug. 2002, pp. 1-7.

Camarillo, G. et al. "Integration of Resource Management and Session Initiation Protocol (SIP)," RFC 3312, Oct. 2002, pp. 1-30.

"EcoCarrier-carrier, long distance, call, VoIP, ITSP, service", www.ecocarrier.com, printed Jun. 13, 2005, pp. 1-3.

"EcoPhone + VoIP!Phone Q-FONE-USB", which appears to come from www.qiiq.com, Jun. 10, 2005, printed Jun. 10, 2005, pp. 1-3.

"Brief Introduction to QiiQ Communications Inc. and Eccocarrier Inc.", www.qiiq.com, printed Jun. 10, 2005 and Jul. 17, 2005, pp. 1-7.

Trembley, J. "VoIP makes real-time billing a necessity", Billing Plus, vol. 6, No. 17, Oct. 4, 2004, p. 13.

"Pre-paid Call Credits—Adding Extra Call Credits", www.2hands.com.au, (added to catalog Jun. 30, 2004), printed Jun. 1, 2005, pp. 1-2.

"SIPphoneCasting. Inspired by: Skype Podcast Recorder = SkypeCasters", linuxathome.com, Dec. 29, 2004, pp. 1-4.

"CommGenie VoIP Suite", www.nexge.com, printed Jun. 1, 2005, pp. 1-3.

"Web Based, VoIP Billing, VoIP Routing, and VoIP Management Software", www.webvoip.com, printed Jun. 1, 2005, pp. 1-2.

Tittel, E. "Cool Tools: USB Desktop Peripherals and Devices", www.certmag.com, Jun. 2005, pp. 1-7.

Bennet, B. "Memory in a Flash", www.theage.com.au, Jan. 31, 2004, pp. 1-3.

Douglas F. Bender, U.S. Appl. No. 12/098,947, entitled "Systems and Methods of Making a Call," filed on Apr. 7, 2008, 32 pages.

Defendants Request that Additional Fees of $42.299.50 Incurred from Feb. 1, 2000 through Feb. 24, 2010 should be added to Attorneys Fees Award, Case No. 107CV082454 for U.S. Appl. No. 10/613,656, e-filed Apr. 15, 2010, 7 pages.

Cardosi Declaration in Support of Defendants' Memorandum of Costs, Case No. 107CV082454 for U.S. Appl. No. 10/613,656, e-filed Apr. 15, 2010, 3 pages.

Order re: Motion for Judgment notwithstanding the verdict; Motion for New Trial; Motion for Attorney's Fees, Case No. 107CV082454 for U.S. Appl. No. 10/613,656, e-filed Apr. 26, 2010, 4 pages.

Plaintiffs' Request to Treat their "Memorandum in Opposition to Motion for Attorney's Fees and Costs and Request for Judicial Notice" as a Motion to Tax Costs, Case. No. 107CV082454 for U.S. Appl. No. 10/613,656, e-filed Jun. 25, 2010, 11 pages.

Supplemental European Search Report from the European Patent Office for corresponding EP Application No. 03763277.5-1244/1527561 dated Jun. 9, 2010, 6 pages.

Memorandum of Points and Authorities in Support of Demurrer, Case No. 107CV082454 for U.S. Appl. No. 10/613,656, dated Jul. 8, 2008, 6 pages.

Memorandum of Points and Authorities in Support of Defendant Reed Smith LLP's Demurrer, Case No. 107CV082454 for U.S. Appl. No. 10/613,656, dated Jul. 8, 2008, 7 pages.

Specially Appearing Defendants Stresser & Associates and Jim Leimback's Memorandum of Points and Authorities in Support of Motion to Quash Service of Summons, Case No. 107CV082454 for U.S. Appl. No. 10/613,656, dated Jul. 8, 2008, 11 pages.

Notice of Motion and Motion to Quash Service and Dismiss Action for Want of Personal Jurisdiction; Memorandum of Points and Authorities, Case No. 107CV082454 for U.S. Appl. No. 10/613,656, dated Jul. 11, 2008, 8 pages.

Opposition to Motion to Quash Service of Summons, Case No. 107CV082454 for U.S. Appl. No. 10/613,656, dated Jul. 11, 2008, 4 pages.

Day 1—Motions in Limine & Jury Selection, Case No. 107CV082454 for U.S. Appl. No. 10/613,656, dated Jan. 11, 2010, 2 pages.

Day 2—Jury Selection & Opening Statements, Case No. 107CV082454 for U.S. Appl. No. 10/613,656, dated Jan. 12, 2010, 3 pages.

Day 3—Plaintiff's Case in Chief, Case No. 107CV082454 for U.S. Appl. No. 10/613,656, dated Jan. 13, 2010, 2 pages.

Day 4—Plaintiff's Case in Chief, Case No. 107CV082454 for U.S. Appl. No. 10/613,656, dated Jan. 14, 2010, 2 pages.

Day 5—Plaintiff's Case in Chief, Case No. 107CV082454 for U.S. Appl. No. 10/613,656, dated Jan. 19, 2010, 2 pages.

Day 6, Jury Trial—Plantiff's Case in Chief, Case No. 107CV082454 for U.S. Appl. No. 10/613,656, dated Jan. 21, 2010, 2 pages.

Day 7, Jury Trial—En camera hearing, Case No. 107CV082454 for U.S. Appl. No. 10/613,656, dated Jan. 22, 2010, 1 page.

Day 8, Jury Trial—Plaintiff's Case in Chief, Case No. 107CV082454 for U.S. Appl. No. 10/613,656, dated Jan. 25, 2010, 2 pages.

Day 9, Plaintiff's Case in Chief, Case No. 107CV082454 for U.S. Appl. No. 10/613,656, dated Jan. 26, 2010, 3 pages.

Day 10, Jury Trial—Defense Case in Chief, Case No. 107CV082454 for U.S. Appl. No. 10/613,656, dated Jan. 27, 2010, 3 pages.

Day 11, Jury Trial—Defense Case in Chief, Case No. 107CV082454 for U.S. Appl. No. 10/613,656, dated Jan. 28, 2010, 2 pages.

Day 12, Jury Trial—Motions & Jury Instructions, Case No. 107CV082454 for U.S. Appl. No. 10/613,656, dated Jan. 29, 2010, 1 page.

Day 13, Jury Trial—Defense Case in Chief, Case No. 107CV082454 for U.S. Appl. No. 10/613,656, dated Feb. 1, 2010, 2 pages.

Day 14, Jury Trial—Closing Statements, Case No. 107CV082454 for U.S. Appl. No. 10/613,656, dated Feb. 2, 2010, 2 pages.

Day 15, Jury Trial—Jury Deliberations, Case No. 107CV082454 for U.S. Appl. No. 10/613,656, dated Feb. 3, 2010, 1 page.

Day 16, Jury Trial—Jury Deliberations & Verdict, Case No. 107CV082454 for U.S. Appl. No. 10/613,656, dated Feb. 4, 2010, 1 page.

Special Verdict [Teng Lew Lim], Case No. 107CV082454 for U.S. Appl. No. 10/613,656, USC filed Feb. 24, 2010, 34 pages.

Case Designated As Complex Civil, No. 107CV082454 for U.S. Appl. No. 10/613,656, e-filed Jun. 24, 2008 7 pages.

Reply Memorandum in Support of Defendant Reed Smith LLP's Demurrer, Case No. 107CV082454 for U.S. Appl. No. 10/613,656, e-filed Jul. 2, 2008, 3 pages.

Case Management Statement of Reed Smith LLP, Case No. 107CV082454 for U.S. Appl. No. 10/613,656, e-filed Jul. 2, 2008, 3 pages.

Specially Appearing Defendants Stresser & Associates and Jim Leimbach's Reply to Plaintiff's Opposition to Specially Appearing Defendants Stresser & Associates and Jim Leimback's Motion to Quash Service of Summons, Case No. 107CV082454 for U.S. Appl. No. 10/613,656, e-filedJul. 3, 2008 6 pages.

Memorandum of Points and Authorities in Reply to Plaintiffs' Opposition to RAM Defendant's Motion to Quash, Case No. 107CV082454 for U.S. Appl. No. 10/613,656, e-filedJul. 3, 2008, 3 pages.

Objections to Declaration of Darius Mostowfi, Submitted in Support of Plaintiffs' Opposition to Motion to Quash, Case No. 107CV082454 for U.S. Appl. No. 10/613,656, e-filed Jul. 3, 2008, 4 pages.

Reply Memorandum of Points and Authorities in Support of Demurrer, Case No. 107CV082454 for U.S. Appl. No. 10/613,656, e-filed Jul. 3, 2008, 3 pages.

Opposition to Motion to Quash Service of Summons, Case No. 107CV082454 for U.S. Appl. No. 10/613,656, e-filed Jul. 9, 2008, 4 pages.

Order Re: Motions to Quash and Demurrers, Case No. 107CV082454 for U.S. Appl. No. 10/613,656, e-filed Jul. 14, 2008, 3 pages.

Order on Objections to Declaration of Darius Mostowfi, Submitted in Support of Plaintiffs' Opposition to Motion to Quash, Case No. 107CV082454 for U.S. Appl. No. 10/613,656, e-filed Jul. 14, 2008, 4 pages.

Notice of Entry of Order Re: Motions to Quash and Demurrers, Case No. 107CV082454 for U.S. Appl. No. 10/613,656, e-filed Jul. 22, 2008, 7 pages.

Defendant Reed Smith LLP's Answer to Complaint; Demand for Jury Trial, Case No. 107CV082454 for U.S. Appl. No. 10/613,656, e-filed Jul. 23, 2008, 8 pages.

First Amended Verified Complaint, Case No. 107CV082454 for U.S. Appl. No. 10/613,656, e-filed Jul. 29, 2008, 33 pages.

Notice of Demurrer and Plaintiffs' Demurrer to Reed Smith's Answer and Affirmative Defenses, Case No. 107CV082454 for U.S. Appl. No. 10/613,656, e-filed Jul. 29, 2008, 7 pages.

Plaintiffs' Request for Judicial Notice, Case No. 107CV082454 for U.S. Appl. No. 10/613,656, e-filed Jul. 29, 2008, 62 pages.

Memorandum of Points and Authorities in Support of Demurrer to First Amended Complaint, Case No. 107CV082454 for U.S. Appl. No. 10/613,656, e-filed Aug. 28, 2008, 8 pages.

Memorandum of Points and Authorities in Support of Defendant Reed Smith LLP's Demurrer to First Amended Complaint, Case No. 107CV082454 for U.S. Appl. No. 10/613,656, e-filed Aug. 29, 2008, 18 pages.

Notice of Hearing on Demurrers; General and Special Demurrers; Memorandum of Points and Authorities, Case No. 107CV082454 for U.S. Appl. No. 10/613,656, e-filed Sep. 2, 2008, 10 pages.

Opposition to Demurrers, Case No. 107CV082454 for U.S. Appl. No. 10/613,656, e-filed Sep. 16, 2008, 54 pages.

Supplemental Response to Demurrer by Reed Smith, Case No. 107CV082454 for U.S. Appl. No. 10/613,656, e-filed Oct. 2, 2008, 10 pages.

Reply in Support of Reed Smith LLP's Demurrer to First Amended Complaint, Case No. 107CV082454 for U.S. Appl. No. 10/613,656, e-filed Oct. 2, 2008, 8 pages.

Reply Memorandum of Points and Authorities in Support of Demurrer to First Amended Complaint, Case No. 107CV082454 for U.S. Appl. No. 10/613,656, e-filed Oct. 3, 2008, 5 pages.

Defendants Jon L. Roberts and Roberts Mardula & Wertheim, LLC's Memorandum of Points and Authorities in Reply to Plaintiffs' Combined "Opposition to Demurrers," Case No. 107CV082454 for U.S. Appl. No. 10/613,656, e-filed Oct. 3, 2008, 6 pages.

Order Re: Demurrers to First Amended Complaint, Case No. 107CV082454 for U.S. Appl. No. 10/613,656, e-filed Oct. 27, 2008, 5 pages.

Order Dismissing Causes of Action for Failure to Amend, Case No. 107CV082454 for U.S. Appl. No. 10/613,656, e-filed Nov. 21, 2008, 2 pages.

Opposition to Motion to Strike, Case No. 107CV082454 for U.S. Appl. No. 10/613,656, e-filed Dec. 10, 2008, 4 pages.

Reply Memorandum of Points and Authorities in Support of Motion to Strike, Case No. 107CV082454 for U.S. Appl. No. 10/613,656, e-filed Dec. 11, 2008, 5 pages.

Judgment, Case No. 107CV082454 for U.S. Appl. No. 10/613,656, e-filed Jan. 5, 2009, 2 pages.

Order of Dismissal, Case No. 107CV082454 for U.S. Appl. No. 10/613,656, e-filed Jan. 5, 2009, 2 pages.

Verified Answer of Defendants I2 Telecom International, Inc. and Paul Arena to First Amended Complaint, Case No. 107CV082454 for U.S. Appl. No. 10/613,656, e-filed Jan. 7, 2009, 9 pages.

Notice of Demurrer and Plaintiffs' Demurrer to Answering Defendants' Answer and Affirmative Defenses, Case No. 107CV082454 for U.S. Appl. No. 10/613,656, e-filed Jan. 13, 2009, 7 pages.

Memorandum of Points and Authorities in Opposition to Demurrer to Answer of Defendants I2 Telecom and Paul Arena, Case No. 107CV082454 for U.S. Appl. No. 10/613,656, e-filed Feb. 6, 2009, 7 pages.

Order Re: Demurrer to verified Answer, Case No. 107CV082454 for U.S. Appl. No. 10/613,656, e-filed Feb. 27, 2009, 5 pages.

Amendment to the Verified Answer of Defendants I2 Telecom International, Inc. and Paul Arena to the First Amended Complaint, Case No. 107CV082454 for U.S. Appl. No. 10/613,656, e-filed Mar. 19, 2009, 8 pages.

Declaration of John Cardosi in Support of Motion for Order Compelling Depositions, Case No. 107CV082454 for U.S. Appl. No. 10/613,656, e-filed Sep. 11, 2009, 35 pages.

Memorandum of Points and Authorities in Support of Defendants' Motions for Summary Judgment and Summary Adjudication of Issues, Case No. 107CV082454 for U.S. Appl. No. 10/613,656, e-filed Sep. 25, 2009, 8 pages.

Defendants' Separate Statement of Undisputed Facts in Support of Motions for Summary Judgment and Summary Adjudication of Issues, Case No. 107CV082454 for U.S. Appl. No. 10/613,656, e-filed Sep. 25, 2009, 43 pages.

Declaration of Paul Arena in Support of Defendants' Motions for Summary Judgment and Summary Adjudication of Issues, Case No. 107CV082454 for U.S. Appl. No. 10/613,656, e-filed Sep. 25, 2009, 2 pages.

Memorandum of Points and Authorities in Support of Defendants Motion for Undertaking [CCP § 1030], Case No. 107CV082454 for U.S. Appl. No. 10/613,656, e-filed Nov. 16, 2009, 8 pages.

Memorandum of Points and Authorities in Opposition to Motion for Summary Judgment, Case No. 107CV082454 for U.S. Appl. No. 10/613,656, e-filed Nov. 30, 2009, 13 pages.

Declaration of Teng Law Lim in Opposition to Defendants' Motion for Summary Judgment or Summary Adjudication, Case No. 107CV082454 for U.S. Appl. No. 10/613,656, e-filed Nov. 30, 2009, 9 pages.

Declaration of Fung Chee Lim in Opposition to Defendants' Motion for Summary Judgment or Summary Adjudication, Case No. 107CV082454 for U.S. Appl. No. 10/613,656, e-filed Nov. 30, 2009, 7 pages.

Declaration of Teng Howe Lim in Opposition to Defendants' Motion for Summary Judgment or Summary Adjudication, Case No. 107CV082454 for U.S. Appl. No. 10/613,656, e-filed Nov. 30, 2009, 5 pages.

Opposition to Motion for Undertaking, Case No. 107CV082454 for U.S. Appl. No. 10/613,656, e-filed Nov. 30, 2009, 7 pages.

Plaintiffs' Response to Defendants' Separate Statement of Undisputed Facts in Support of Motions for Summary Judgement and Summary Adjudication of Issues; and Plaintiffs' Separate Statement of Undisputed Facts, Case No. 107CV082454 for U.S. Appl. No. 10/613,656, e-filed Nov. 30, 2009, 50 pages.

Excerpts of Depositions of Paul Arena, Brian Harris, Jack Robinson, and John Cooney, Case No. 107CV082454 for U.S. Appl. No. 10/613,656, e-filed Nov. 30, 2009, 63 pages.

Reply Memorandum of Points and Authorities in Support of Defendants Motions for Undertaking [CCP § 1030], Case No. 107CV082454 for U.S. Appl. No. 10/613,656, e-filed Dec. 4, 2009, 10 pages.

Reply Memorandum in Support of Summary Judgment and Summary Adjudication of Issues, Case No. 107CV082454 for U.S. Appl. No. 10/613,656, e-filed Dec. 7, 2009, 9 pages.

Cardosi Declaration in Support of Defendants' Motions for Summary Judgment and Summary Adjudication, Case No. 107CV082454 for U.S. Appl. No. 10/613,656, e-filed Dec. 7, 2009, 22 pages.

Order Re: Motion for Summary Judgment/Adjudication; Motion for Undertaking, Case No. 107CV082454 for U.S. Appl. No. 10/613,656, e-filed Dec. 14, 2009, 3 pages.

Exhibit in Opposition to Motion for Summary Judgment (Exceprts of vol. 5 of Deposition of Paul Arena, dated Nov. 17, 2009), Case No. 107CV082454 for U.S. Appl. No. 10/613,656, e-filed Dec. 15, 2009, 40 pages.

Plaintiffs' Settlement Conference Settlement, Case No. 107CV082454 for U.S. Appl. No. 10/613,656, e-filed Dec. 28, 2009, 32 pages.

Mandatory Settlement Conference Statement, Case No. 107CV082454 for U.S. Appl. No. 10/613,656, e-filed Dec. 29, 2009, 20 pages.

Motion in Limine to Exclude Evidence and Argument that Releases are Product of Fraud or Duress, Case No. 107CV082454 for U.S. Appl. No. 10/613,656, e-filed Jan. 4, 2010, 2 pages.

Motion in Limine to Exclude Certain Statements Pursuant to Evidence Code Section 352, Case No. 107CV082454 for U.S. Appl. No. 10/613,656, e-filed Jan. 4, 2010, 7 pages.

Motion in Limine to Exclude Evidence Pursuant to Evidence Code Section 352 and Evidence Code Section 1151, Case No. 107CV082454 for U.S. Appl. No. 10/613,656, e-filed Jan. 4, 2010, 4 pages.

Statement of the Case & Trial Brief, Case No. 107CV082454 for U.S. Appl. No. 10/613,656, e-filed Jan. 5, 2010, 7 pages.

Trial Brief, Case No. 107CV082454 for U.S. Appl. No. 10/613,656, e-filed Jan. 5, 2010, 9 pages.

Supplemental Trial Brief Regarding Expert Witnesses, Case No. 107CV082454 for U.S. Appl. No. 10/613,656, e-filed Jan. 6, 2010, 3 pages.

Plaintiffs' Motion for Leave to Amend First Amended Verified Complaint, Case No. 107CV082454 for U.S. Appl. No. 10/613,656, e-filed Jan. 7, 2010, 5 pages.

Response to Defendants' Motion in Limine, Case No. 107CV082454 for U.S. Appl. No. 10/613,656, e-filed Jan. 8, 2010, 71 pages.

Stipulated Statement of the Case, Case No. 107CV082454 for U.S. Appl. No. 10/613,656, e-filed Jan. 8, 2010, 2 pages.

Response to Defendants' Motions in Limine Regarding Duress and Fraud as Defense to Releases, Case No. 107CV082454 for U.S. Appl. No. 10/613,656, e-filed Jan. 8, 2010, 6 pages.

Plaintiffs' Offer of Proof Re Expert Witnesses, Case No. 107CV082454 for U.S. Appl. No. 10/613,656, e-filed Jan. 11, 2010, 5 pages.

Opposition to motion for Nonsuit at the Close of Plaintiffs' Evidence, Case No. 107CV082454 for U.S. Appl. No. 10/613,656, e-filed Feb. 1, 2010, 7 pages.

Plaintiffs' Motion to Void Certain Contracts as Illusory or Against Public Policy, Case No. 107CV082454 for U.S. Appl. No. 10/613,656, e-filed Feb. 2, 2010, 3 pages.

Defendants' Supplemental Trial Brief Re: Whether there are Equitable Issues Left for the Court to Try, Case No. 107CV082454 for U.S. Appl. No. 10/613,656, e-filed Feb. 19, 2010, 6 pages.

Memorandum if Points and Authorities in Support of Plaintiffs' Request for Judgment on Constructive Trust without Prejudice to JNOV or New Trial, Case No. 107CV082454 for U.S. Appl. No. 10/613,656, e-filed Feb. 19, 2010, 13 pages.

Notice of Intent to File a Motion for New Trial and Notice of Motion for Judgment notwithstanding the Verdict, Case No. 107CV082454 for U.S. Appl. No. 10/613,656, e-filed Mar. 5, 2010, 4 pages.

Motion for Judgment notwithstanding the Verdict or in the alternative, Judgment for Constructive Trust, or in further alternative, Motion for a New Trial; and Memorandum in Support of Motion for JNOV or New Trial, Case No. 107CV082454 for U.S. Appl. No. 10/613,656, e-filed Mar. 5, 2010, 15 pages.

Memorandum of Points and Authorities in Support of Defendants Motion for Attorney's fees, Case No. 107CV082454 for U.S. Appl. No. 10/613,656, e-filed Mar. 12, 2010, 6 pages.

Cardosi Declaration in Support of Defendants' Motion for Attorneys Fees, Case No. 107CV082454 for U.S. Appl. No. 10/613,656, e-filed Mar. 12, 2010, 4 pages.

Notice of Appeal, Case No. 107CV082454 for U.S. Appl. No. 10/613,656, e-filed Mar. 29, 2010, 3 pages.

Memorandum in Opposition to Motion for Attorney's Fees and Costs and Request for Judicial Notice, Case No. 107CV082454 for U.S. Appl. No. 10/613,656, e-filed Apr. 7, 2010, 8 pages.

Defendant's Memorandum of Points and Authorities in Opposition to Motions for JNOV and New Trial, Case No. 107CV082454 for U.S. Appl. No. 10/613,656, e-filed Apr. 9, 2010, 15 pages.

Plaintiffs' Reply re Motion for JNOV and Alternative Motion for New Trial, Case No. 107CV082454 for U.S. Appl. No. 10/613,656, e-filed Apr. 13, 2010, 7 pages.

The International Search Report or the Declaration from the International Searching Authority (ISA/US) received for International Application No. PCT/US03/21190, mailed Oct. 23, 2003, 6 pages.

Written Opinion received from the International Preliminary Examining Authority (IPEA/US) received for International Application No. PCT/US03/21190, mailed May 12, 2004, 4 pages.

International Preliminary Examination Report received from the International Preliminary Examining Authority (IPEA/US) received for International Application No. PCT/US03/21190, mailed Nov. 29, 2003, 4 pages.

Communication Pursuant to Article 94(3) EPC from the European Patent Office (EPO) received for European Application No. 03 763 277.3-1244, dated Oct. 19, 2010, 6 pages.

* cited by examiner

FIGURE 3

| Function | PURPOSE |
|---|---|
| Label (char *Label_name); | Mark a spot so it can be jumped to |
| Goto (char *Label_name); | When executed moves instruction pointer to location marked by label |
| Switch (unsigned int condition); | The Switch() and corresponding End_Switch() functions group a collection of Case() functions, see below. The value used by the Case() function for matching is expressed as the parameter to this function. |
| Switch_On_Token(); | The Switch_On_Token() and corresponding End_Switch() functions group a collection of Case() functions, see below. The top token in the logical token queue associated with the current state (see Begin_State() below) is used by the nested Case() functions for matching. |
| Case (unsigned int condition); | Code following this instruction will be executed if the value of the condition argument matches the value asserted by the corresponding switch Switch() or Switch_On_Token() |
| End_Switch(); | Identifies the end for the influence for the previous Switch() or Switch_On_Token() functions. |
| Begin_State(char *Label_name); | Designates the beginning of a state. States may not be nested |
| End_State(); | Designates the end of a state |
| Transition_To(char *Label_name); | Argument specifies the name of the state to enter. Execution for the current state stops. |
| Trace(char *string); | Prints the string out to the serial port |
| Play(int tone); | Plays the specified tone in the phone handset |
| Send(char *message); | Sends the specified message to the other calling party |

Begin_State("Call Initiated");
        Send(setup) ;
        Wait_for_Token( ) ;  // Wait for result from setup
        Switch_On_Token( )
                Case( BUSY ) ;
                        Transition_To( "BusyTone" ) ;
                Case(TIMEOUT) ;
                        Transition_To("FastBusyTone") ;
                Case(CONNECT) ;
                        Transition_To("CallDelivered") ;
        End_Switch( ) ;
EndState();

//----------------------------------------------

Begin_State("Busy Tone");
        Play(BUSY_TONE) ;
End_State();

//----------------------------------------------

Begin_State("Call Delivered");
        Init_Vocoder
        Send(CONNECT_ACK);
        TransitionTo("Voice");
EndState();

//----------------------------------------------

Begin_State("Fast Busy Tone");
        Play(FAST_BUSY_TONE) ;
End_State();

//----------------------------------------------

Begin_State("Voice");
        // initiate 2-way voice between caller and callee
        ...
End_State();
```

SYSTEM AND METHOD FOR USING MULTIPLE COMMUNICATION PROTOCOLS IN MEMORY LIMITED PROCESSORS

CROSS REFERENCE TO RELATED APPLICATIONS

This application claims priority under 35 U.S.C. §119(e) from provisional application No. 60/394,207 filed Jul. 5, 2002 and application Ser. No. 10/354,527 filed Jan. 30, 2003 both of which applications are incorporated by reference herein, in their entirety, for all purposes.

FIELD OF THE INVENTION

The present invention relates generally to implementation of telecommunication protocols. More particularly, the present invention relates to the implementation of large and/or multiple telecommunication protocols utilizing memory-limited processors.

BACKGROUND OF THE INVENTION

Less than thirty years ago, the term "telecommunications" connoted making and receiving telephone calls over the public switched telephone network (PSTN) built by AT&T. Today, telecommunications means transporting data representing voice, video, text, and instructions over wired and wireless digital networks such as the Internet.

Within the PSTN telephony environment the equipment needed to support the telecommunications infrastructure was centralized at a telephone company "central office" so that Customer Premises Equipment (CPE) could be limited to simple telephones. The nature of modern digital networks is to decentralize many functions and capabilities thus requiring more complex CPE to provide access. However, subscribers expect newer digital telecommunications to be usable with the same ease as the traditional telephone and at low cost. This expectation dictates that the digital network interfaces and associated protocols be compact and unobtrusive, implemented inexpensively, and require little in the way of subscriber interaction.

The complexity of implementing a CPE for digital telecommunications comes primarily from the need to implement the protocols used to organize information sent over digital networks. These protocols evolved in rich computing environments with many computing resources (e.g. CPU power for computation; memory for data and program storage). Additionally, the protocols evolved quickly (i.e. in months or years, vs. the traditional PSTN years or decades), reflecting knowledge gained from actual application. The CPE for digital communications of today must, therefore, have an effective way to deal with protocol implementation within the restricted computational resources dictated by the CPE's restricted hardware cost.

What would be useful is a system and method for implementing multiple digital telecommunication protocols on a reduced hardware CPE that is not limited to any specific protocol.

SUMMARY OF THE INVENTION

An embodiment of the present invention is a telecommunications gateway that implements telecommunication protocols using a telecommunication protocol engine (TPE). Telecommunication protocols comprise multiple digital networking protocols (e.g., Session Initiation Protocol (SIP), H.323, DHCP, TCP/IP and STUN protocol) and telephony protocols. However, the present invention is not so limited. As will be apparent to those skilled in the art, any protocol that facilitates telecommunications over digital networks (both between digital devices, a digital device and an analog device, and between analog devices) may be implemented by the TPE without departing from the scope of the present invention.

In this embodiment, the TPE is implemented using inexpensive, memory limited microprocessors and inexpensive flash memory. However, this is not meant as a limitation. As will be apparent to those skilled in the art, the present invention may be implemented in other computing contexts without departing from the scope of the present invention.

Therefore, an aspect of the present invention is an implementation of a telecommunication protocol engine (TPE) using a memory limited microprocessor and flash memory.

Another aspect of the present invention is an implementation of a (TPE) using is a "virtual machine" that executes instructions from flash memory.

Another aspect of the present invention is the representation of telecommunication protocols as Finite State Machine (FSM) abstractions.

Still another aspect of the present invention is the implementation of a virtual machine to support FSMs used to express protocol implementation.

A further aspect of the present invention is the implementation of FSMs using virtual machine instructions stored in a flash memory, wherein the virtual machine instructions represent telecommunication protocols implemented as states, instructions, and transitions.

Yet another aspect of the present invention is a CPE Control Protocol that specifies how an end user can control the behavior of the CPE using a standard telephone that may be connected directly to the CPE or that accesses the CPE remotely.

An aspect of the present invention is a telephony gateway comprising a TPE.

Another aspect of the present invention is the implementation of the Session Initiation Protocol (SIP), H.323 protocol, DHCP and STUN protocol as FSM.

These and other aspects of the present invention will become apparent from a review of the general and detailed descriptions that follow. An embodiment of the present invention is a telecommunications gateway that implements multiple digital networking protocols using a telecommunication protocol engine (TPE). In this embodiment, the TPE is implemented using inexpensive, memory limited microprocessors and inexpensive flash memory. However, this is not meant as a limitation. As will be apparent to those skilled in the art, the present invention may be implemented in other computing contexts without departing from the scope of the present invention.

A finite state machine (FSM) execution facility is implemented using virtual machine instructions located in the flash memory. The "state" of a given instance of a FSM is located in the RAM and accessed by the microprocessor. As the virtual machine executes instructions from the flash memory, it modifies the FSM state in RAM along with accessing other facilities of the microprocessor and other software resources.

Another embodiment of the present invention comprises a method for representing a protocol as a FSM using an extension of the C++ programming language. Specifically, an FSM specification may be created on a development computer using C++ with a specialized library. The result is a program that, when executed on the development computer, produces virtual machine instructions that can be loaded into the flash memory of the TPE. The virtual machine within the TPE microprocessor then uses these instructions as described above. While this embodiment uses the C++ programming language and a C++ library, the present invention is not so limited. As will be appreciated by those skilled in the art, other programming languages (and related libraries) may be used to produce virtual machine instructions that define an FSM.

An additional aspect of the present invention is the specification of a CPE Control Protocol that is implemented using the technique described above. This protocol specifies how an end user can control the behavior of the CPE using a standard telephone that may be connected directly to the CPE or accessing the CPE remotely by "calling" over either a VoIP or PSTN connection. This protocol allows the user to direct the CPE to place a local telephone to VoIP call; a local telephone to local PSTN call or a received VoIP call routed to the local PSTN based call. Additionally, this protocol allows the user to modify other operations of the CPE.

The CPE Control Protocol receives input from the user via the standard telephone touch-tone keypad. Specifically, the user enters a pound-sign (#), a sequence of digits or stars identifying the operation with any related data and a terminating pound-sign (#) indicating the end of user input. The CPE Control Protocol communicates with the user via one or more facilities depending on the originating location of the command. These include: flashing of the LEDs on the CPE, generation of tones played over the telephone; voice commands played over the telephone; placing a call back to the telephone and using the "Caller ID" mechanism to present alpha numeric data via the telephones Caller ID display facility.

BRIEF DESCRIPTION OF THE DRAWINGS

FIG. 3 illustrates means for expressing a FSM according to an embodiment of the present invention.

FIG. 5 illustrates a script created using a scripting language to implement the protocol illustrated in FIG. 4.

DETAILED DESCRIPTION OF THE EMBODIMENTS

An embodiment of the present invention is a telecommunications gateway that implements multiple protocols using a telecommunication protocol engine (TPE). In this embodiment, the TPE is implemented using an inexpensive, memory limited microprocessors and inexpensive flash memory. A finite state machine (FSM) execution facility is implemented in firmware using virtual machine instructions located in the flash memory. The "state" of a given instance of a FSM is located in the RAM and accessed by the microprocessor. As the virtual machine executes instructions from the flash memory, it modifies the FSM state in RAM along with accessing other facilities of the microprocessor and other software resources. However, this is not meant as a limitation. As will be apparent to those skilled in the art, the present invention may be implemented in other computing contexts without departing from the scope of the present invention.

Figure 1A:
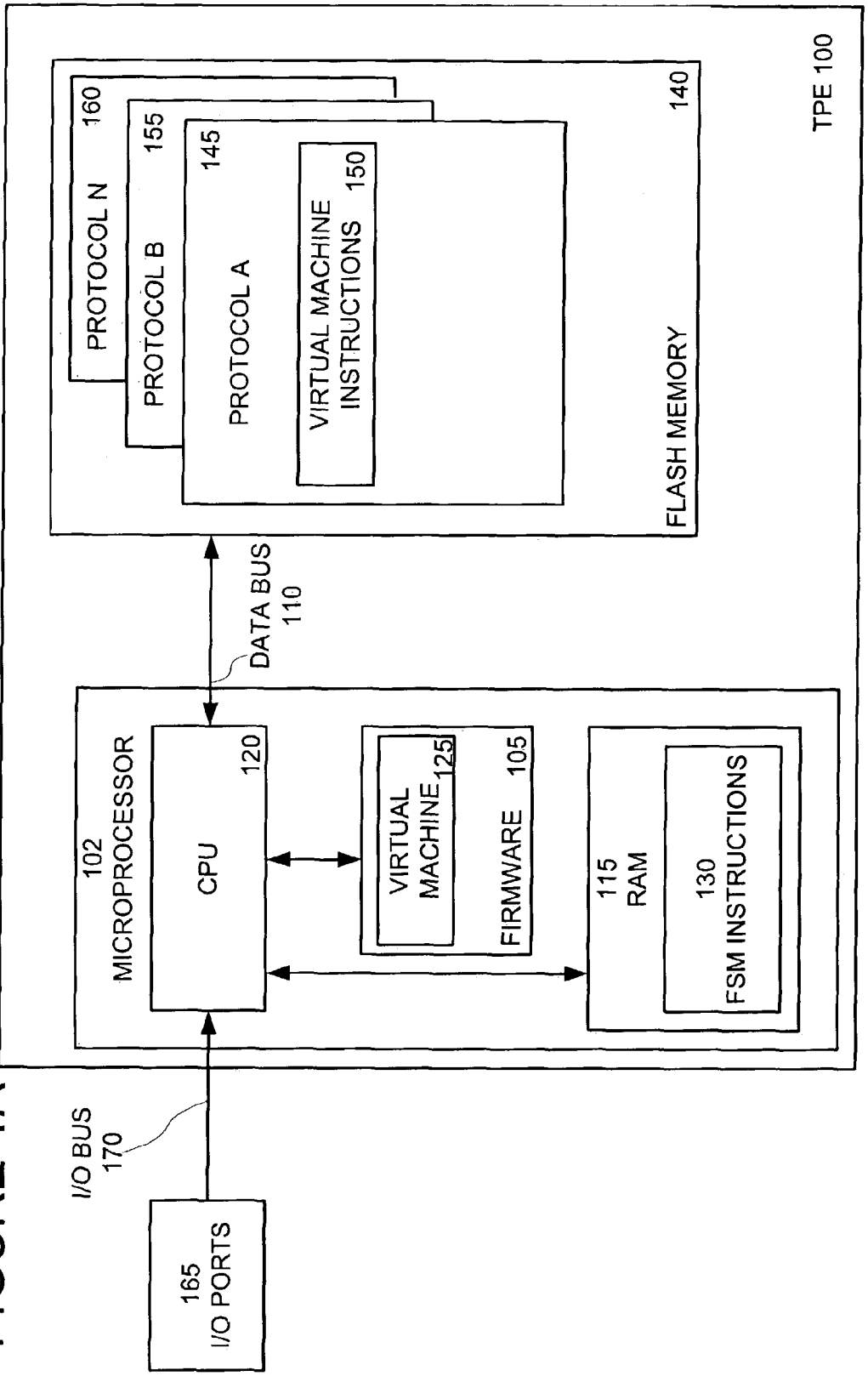
FIG. 1A illustrates a functional block diagram of a telecommunication protocol engine according to an embodiment of the present invention.

Referring to FIG. 1A, a block diagram of a TPE 100 according to an embodiment of the present invention is illustrated. The TPE comprises microprocessor 102 and flash memory 140. Microprocessor 102 comprises CPU 120, RAM 115, and firmware 105 in which a virtual machine 125 resides. The CPU 120 runs the virtual machine 125 and communicates with the flash memory 140 over data bus 110. In the preferred embodiment, data bus 110 is a parallel bus, but this is not meant as a limitation. In another embodiment, data bus 110 is a serial bus. The flash memory holds protocol templates for protocol A 145, protocol B 155, and protocol N 160 and data relating to each protocol. Each template comprises virtual machine instructions defining one or more FSMs implementing a particular protocol, illustrated for protocol A only 150.

The template provides the specifications for the one or more FSMs that represent a single protocol. Each FSM specification is used to generate a set of virtual machine instructions (illustrated in FIG. 1A for protocol A 150) that define a FSM implementing all or a portion of a particular protocol.

Figure 1B:
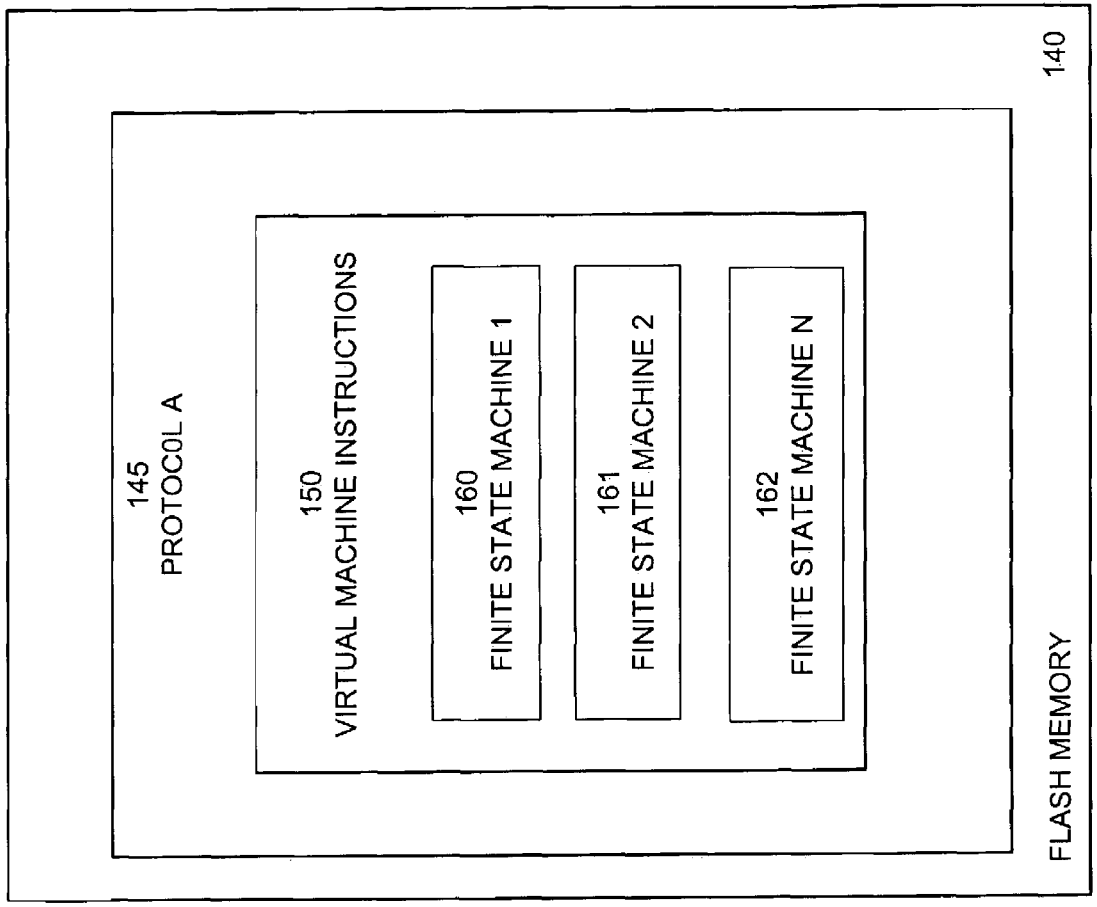
FIG. 1B illustrates a functional block diagram of a telecommunication protocol according to an embodiment of the present invention.

FIG. 1B illustrates a functional block diagram of a telecommunication protocol according to an embodiment of the present invention. Protocol A 145 comprises virtual machine instructions 150. The virtual machine instructions 150 for protocol A 145 define finite state machine 1 160, finite state machine 2 161, and finite state machine N 162. Thus, a single protocol may comprise more than one finite state machine. Telecommunication protocols comprise multiple digital networking protocols (e.g., Session Initiation Protocol (SIP), H.323, DHCP, TCP/IP and STUN protocol) and telephony protocols. However, the present invention is not so limited. As will be apparent to those skilled in the art, any protocol that facilitates telecommunications over digital networks (both between digital devices, a digital device and an analog device, and between analog devices) may be implemented by the TPE without departing from the scope of the present invention.

The virtual machine instructions are read and executed on demand by a virtual machine that resides in firmware 105. Since the microprocessor 120 (see FIG. 1A and 1C) retrieves instructions in response to a request from the virtual machine 125, only a tiny portion of an entire protocol specification (specifically one virtual machine instruction and its associated operands) is stored in RAM 115 at any given time. One advantage of this arrangement is that the RAM 115 contains only the currently executing virtual machine instruction and data, and a few miscellaneous data structures needed for representing the current FSM states (also fixed in size). The content of the flash memory 140—which can be quite sizeable if it implements a number of complex protocols—does not utilizes any significant portion of RAM 115. The size of the virtual machine instructions 150 is limited by the amount of flash memory 140 available, and has no significant impact on the RAM 115 resources. This allows complex protocols to be implemented on very low cost microcontroller architectures in which program and data memory is very limited but flash memory is plentiful.

Figure 1C:
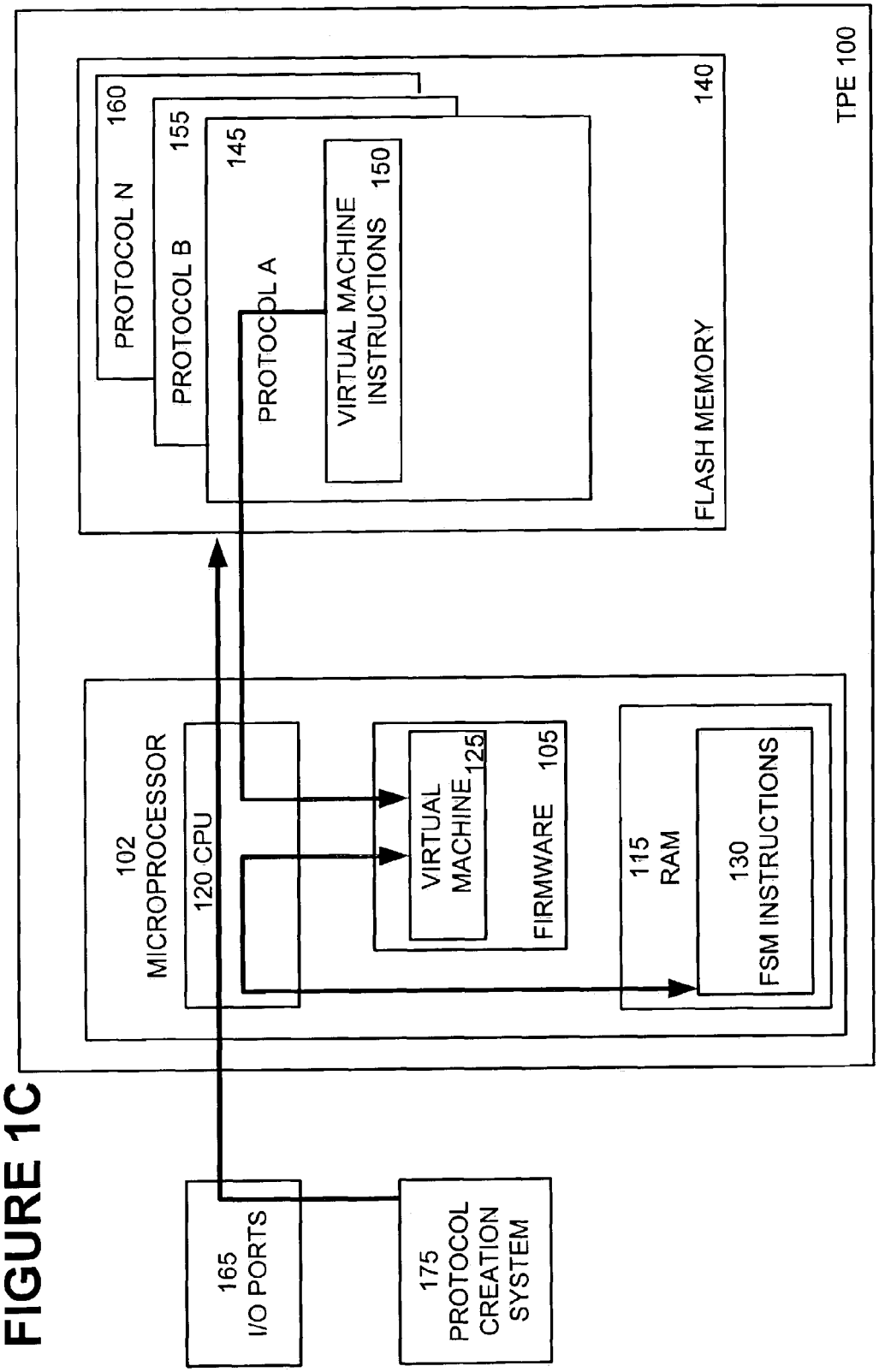
FIG. 1C illustrates a function block diagram showing data flows in a telecommunication protocol engine according to an embodiment of the present invention.

FIG. 1C illustrates a function block diagram showing data flows in a telecommunication protocol engine according to an embodiment of the present invention. The bus references have been deleted for clarity. A protocol creation system 175 produces virtual machine instructions 150. In an embodiment of the present invention, protocol creation system 175 comprises a C++ development environment that is used to encode an FSM specification for a protocol as human readable text. The resulting C++ program is then executed to generate the virtual machine code that is store in the flash memory 140 via I/O ports 165 and I/O bus 170. While this embodiment uses the C++ programming language and a C++ library, the present invention is not so limited. As will be appreciated by those skilled in the art, other programming languages (and related libraries) may be used to produce virtual machine instructions that define an FSM.

A virtual machine instruction and its operands 150 are retrieved, by the CPU 120 at the direction of the virtual machine 125 and stored in RAM 115 for execution. Virtual machine 125 then executes the instruction that was retrieved.

Figure 2:
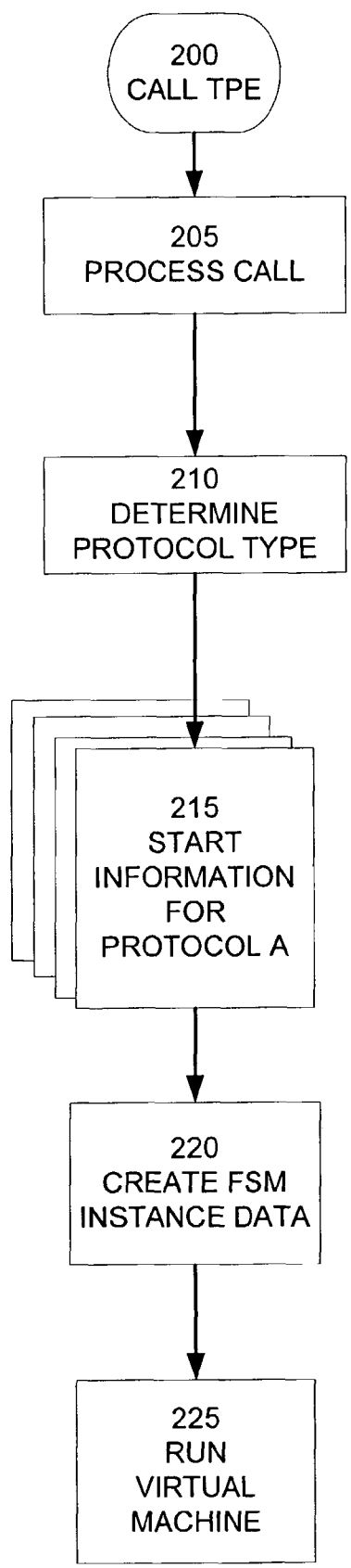
FIG. 2 illustrates a flowchart of a process for implementing a telecommunication according to an embodiment of the present invention.

A telecommunication protocol is implemented in accordance with the process embodiment illustrated in FIG. 2. A call is made to the TPE to implement a telecommunication protocol 200. The call is processed 205 by the microprocessor via the TPE software, which determines which telecommunication protocol is to be implemented 210 and where the protocol template resides in flash memory 215. FSM data is then created in RAM and initialized to represent the state of the FSM used to implement the protocol 220. The virtual machine 225 then starts executing instructions from a location within the flash memory based upon the FSM data.

The classic definition of a FSM is a collection of states. When a FSM is being executed, it is said to be "in" a specific state waiting for an event. When an event occurs, the FSM definition asserts a next state to be entered. When a state is entered a set of actions may performed, then the FSM waits in that state for the next event. This FSM operational model is implemented directly by the virtual machine described above in reference to FIG. 1B and supported by the specialized virtual machine instructions generated from the FSM that expresses the protocol. Specifically, the State entry actions are expressed as specialized virtual machine instructions. Additional the virtual machine is capable of executing multiple FSM at the same time be they multiple instances of one FSM definition or different FSM definitions. It is through this facility that the TPE supports multiple protocols concurrently.

The virtual machine in this embodiment is specially designed to operate with events modeled as "tokens" so that it can respond to both physical events identified by the microprocessor firmware or logical events generated by other FSM being concurrently executed in a uniform manner. The representation of "tokens" and their management further enhances the TPE to operate on very low cost microprocessor architectures in which program and data memory is very limited.

Virtual machine instructions are generated using a "translator" that receives human-readable syntax and translates this syntax to FSM instructions. To facilitate the specification of a protocol in human readable form and support its maintenance as the protocol evolves over time, the translator and virtual machine support the concept of shared state entry instructions through function or macros. These are collections of virtual machine instructions that reside in the flash memory, along with FSM specifications. As required, the virtual machine can execute these special collections of instructions upon demand.

FIG. 3 illustrates a means for expressing FSM according to an embodiment of the present invention. Referring to FIG. 3, a function name is associated with a purpose. These function name/purpose pairs are used to author protocol implementations via FSM definitions. A function name/purpose pair (referred to as an "Advocate") corresponds to a facility "known" to the virtual machine that is implemented in the firmware. While this exemplary embodiment uses the C++ programming language, the present invention is not so limited. As will be appreciated by those skilled in the art, other programming languages may be used to produce virtual machine instructions that define an FSM.

The C++ definition of each Advocate comprises code that produces the appropriate virtual machine instructions that will be placed into the flash memory. Note that some Advocates take parameters. The task of setting up virtual machine instructions for accessing and updating these parameters is also performed by C++ code within the body of the Advocate.

Figure 4:
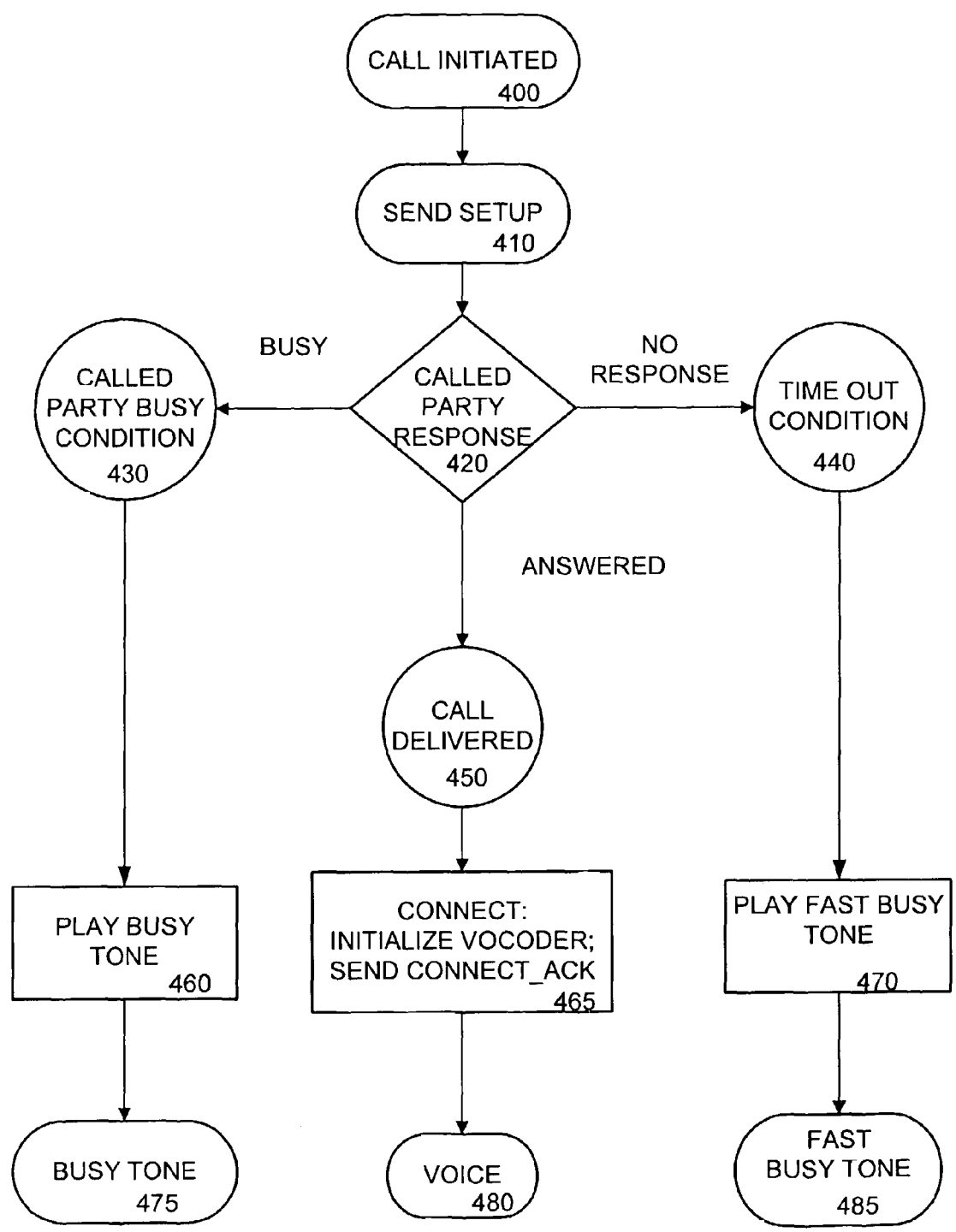
FIG. 4 illustrates a VoIP telecommunication between a caller and a called party from the perspective of the caller according to an embodiment of the present invention.

FIG. 4 illustrates a VoIP telecommunication protocol according to an embodiment of the present invention between a caller and a called party from the perspective of the caller. FIG. 5 illustrates a script according to an embodiment of the present invention created using the scripting language (FIG. 3) to implement the protocol illustrated in FIG. 4. The caller initiates a call 400 causing the FSM to send a message to the called party 410. Referring to FIG. 5, the initial state of the FSM is "CALL INITIATED." The FSM then receives signaling messages via the network from the called party indicating the response (status) 420 of the called party. If the called party is busy, the FSM receives a CALLED PARTY BUSY condition (referred to as an event) 430, executes a PLAY BUSY TONE command (an action) 460, and enters the state "BUSY TONE" 475. Similarly, if there is no response from the called party and the call times out 440, the FSM receives a TIME OUT condition 440, executes a PLAY FAST BUSY TONE command 470 and enters the state "FAST BUSY TONE" 485. If the call is delivered, the FSM receives a CALL DELIVERED condition 430, executes both an "Init Vocoder" and "Send (CONNECT$_{13}$ ACK)" instruction 465, and enters the state "Voice" 480.

Figure 6:
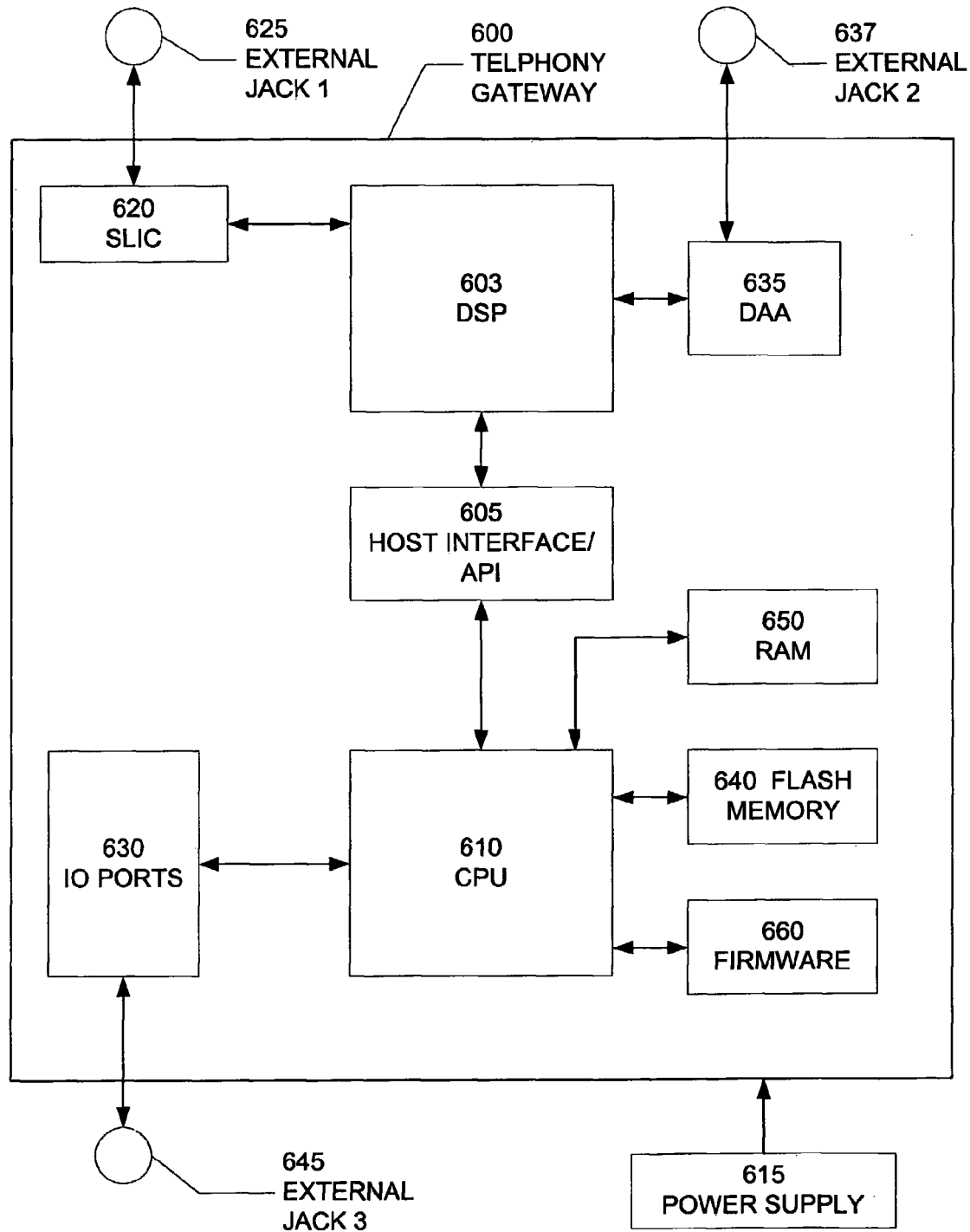
FIG. 6 illustrates a block diagram of a telephony gateway according to an embodiment of the present invention.

FIG. 6 illustrates a block diagram of a telephony gateway 600 according to an embodiment of the present invention. A digital signal processor (DSP) 603 communicates with a CPU 610 over a host interface/API 605. Power to the telephony gateway 600 is provided via A power supply 615. DSP 600 communicates with a subscriber line interface (SLI) 620 that offers connection to consumer premises equipment through an external jack 1 625. The SLI 620 interfaces with customer premises equipment, such as a telephone. DSP 600 communicates with a data access arrangement (DAA) 635 that offers connection to the public switched telephone network (PSTN) through an external jack 2 637.

The CPU 610 is connected to a RAM 650, to a flash memory 640, and to a firmware unit 660. Together, the CPU 610, the RAM 650, the flash memory 640, and the firmware unit comprise a telecommunication protocol engine as described in the context of FIG. 1. The CPU 610 also provides an interface to I/O ports 630. In an embodiment of the present invention, I/O ports 630 comprises a serial interface and an Ethernet interface. The I/O ports are accessible through an external jack 3 645. It is anticipated that as RAM becomes cheaper and more capable of enhanced storage that firmware unit 660 can also reside within RAM 650.

Figure 7:
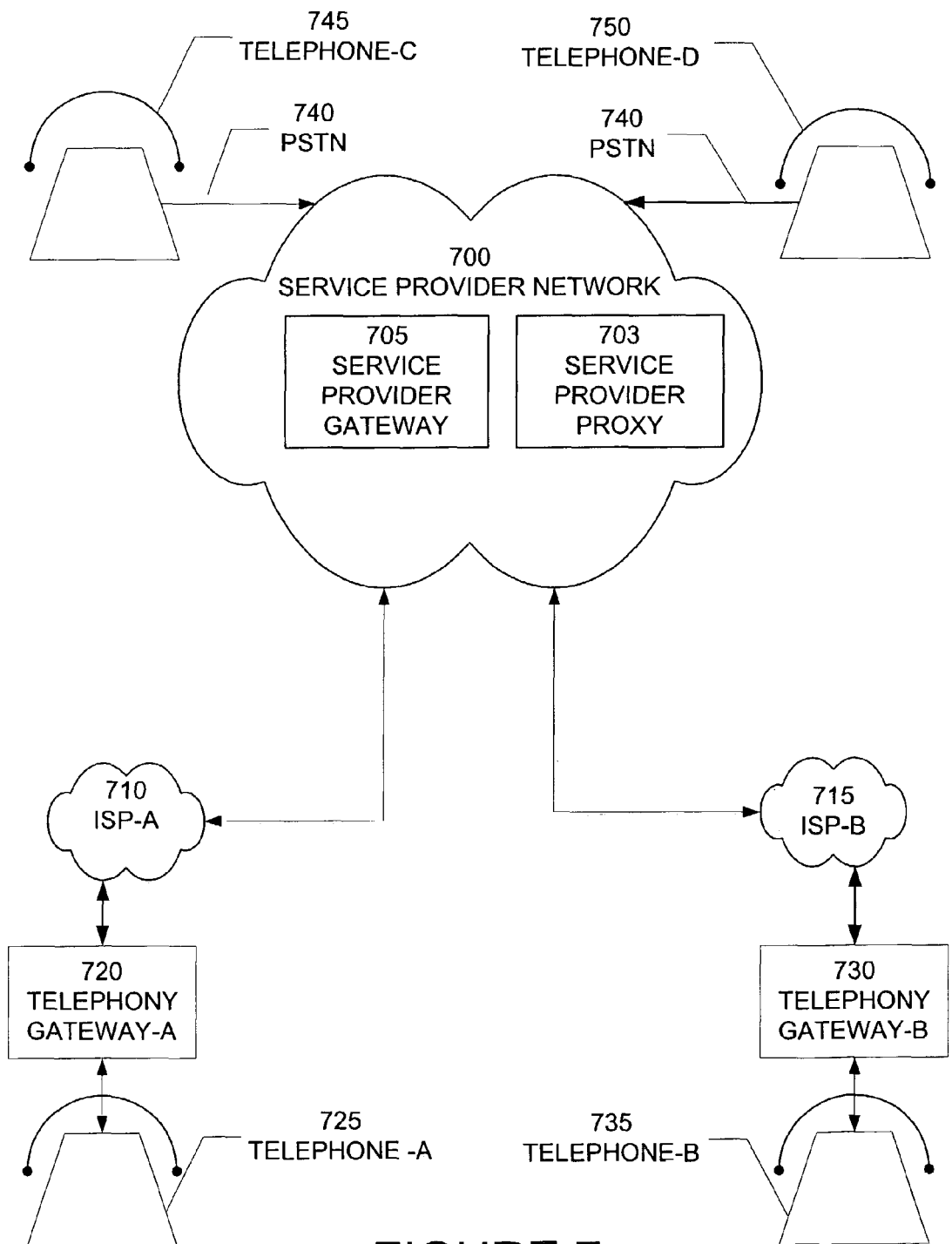
FIG. 7 illustrates a service offering according to an embodiment of the present invention

FIG. 7 illustrates a service offering according to an embodiment of the present invention. Referring to FIG. 7, a service provider network 700 comprises a service provider proxy 703, a service provider gateway 705 and connectivity to the public switched telephone network (PSTN) 740, ISP-A network 710, and ISP-B network 715. A telephony gateway-A 720 is in communication with ISP-A network 710. Telephone-A 725 is connected to telephony gateway-A 720. Similarly, a telephony gateway-B 730 is in communication with ISP-B network 715. Telephone-A 735 is connected to telephony gateway-B 730.

The connection between a telephony gateway (720,730) and its associated ISP network (710, 715) is made by means known in the art. By way of illustration and not as a limitation, telephony gateway-A 720 is in communication with ISP-A network 710 using DSL connection. Telephony gateway-B 730 is in communication with ISP-B network 715 via a dialup connection. It is noteworthy that no general-purpose computer is required to establish communication between a telephony gateway (720, 730) and the service provider gateway 705.

Both telephony gateway-A 720 and telephony gateway-B 730 are registered with service provider network 700. Telephony gateway-A 720 may place a call to telephony gateway-B 730 by interacting with the service provider network 700. The service provider proxy 703 then contacts telephony gateway-B 730 on behalf of telephony gateway-A 720 to facilitate call setup (also known in the art as signaling). Once the signaling has been completed, telephony gateway-A 720 interacts directly with telephony gateway-B 730 passing information until the call is terminated. When the call is terminated, call tear down singling is performed through the service provider network proxy 703.

Both telephony gateway-A 720 and telephony gateway-B 730 are registered with service provider network 700. Service provider network 700 is also connected to the PSTN 740, which is connected to telephone-C 745 and telephone-D 750. A call placed by telephony gateway-A 720 to telephone-C via the PSTN 740 would involve call setup and tear down signaling between telephony gateway-A 720, server provider proxy 703, and service provider gateway 705.

A call placed over a service provider network 706 is routed by service provider gateway 705. In an embodiment of the present invention, the protocol used by a telephony gateway (720, 730) and the routing is controlled by a number dialed to initiate a telephone call via a CPE Control protocol. By way of illustration and not as a limitation, a call placed from telephone-A 725 to telephone-B 735 is an "on-network" call, meaning both the calling party and receiving party are using registered telephony gateways (720, 730). In this embodiment of the present invention, the telephone numbers associated with registered telephony gateways begin with the same prefix, for example 777. In this embodiment, the calling party using telephone-A 725 presses #777(plus the remaining telephone number digits)# on telephone-A 725 (note that the starting and ending pound-sings (#) reflect the requirements of the CPE Control protocol). Service provider gateway 705 determines from the prefix preceding the remaining telephone number digits that the call is on-network and connects telephone-A 725 to telephone-B 735 over a service provider network 700.

By contrast, if telephone-A 725 places a call to telephone-C 745, the call is dialed using the standard prefix (1+areacode+number) again bracketed by the pound-sings required by the CPE Control protocol (e.g. #16503288459#).

As will be apparent to those skilled in the art, other signaling conventions may be used to route telephone calls without departing from the scope of the present invention.

Figure 8:
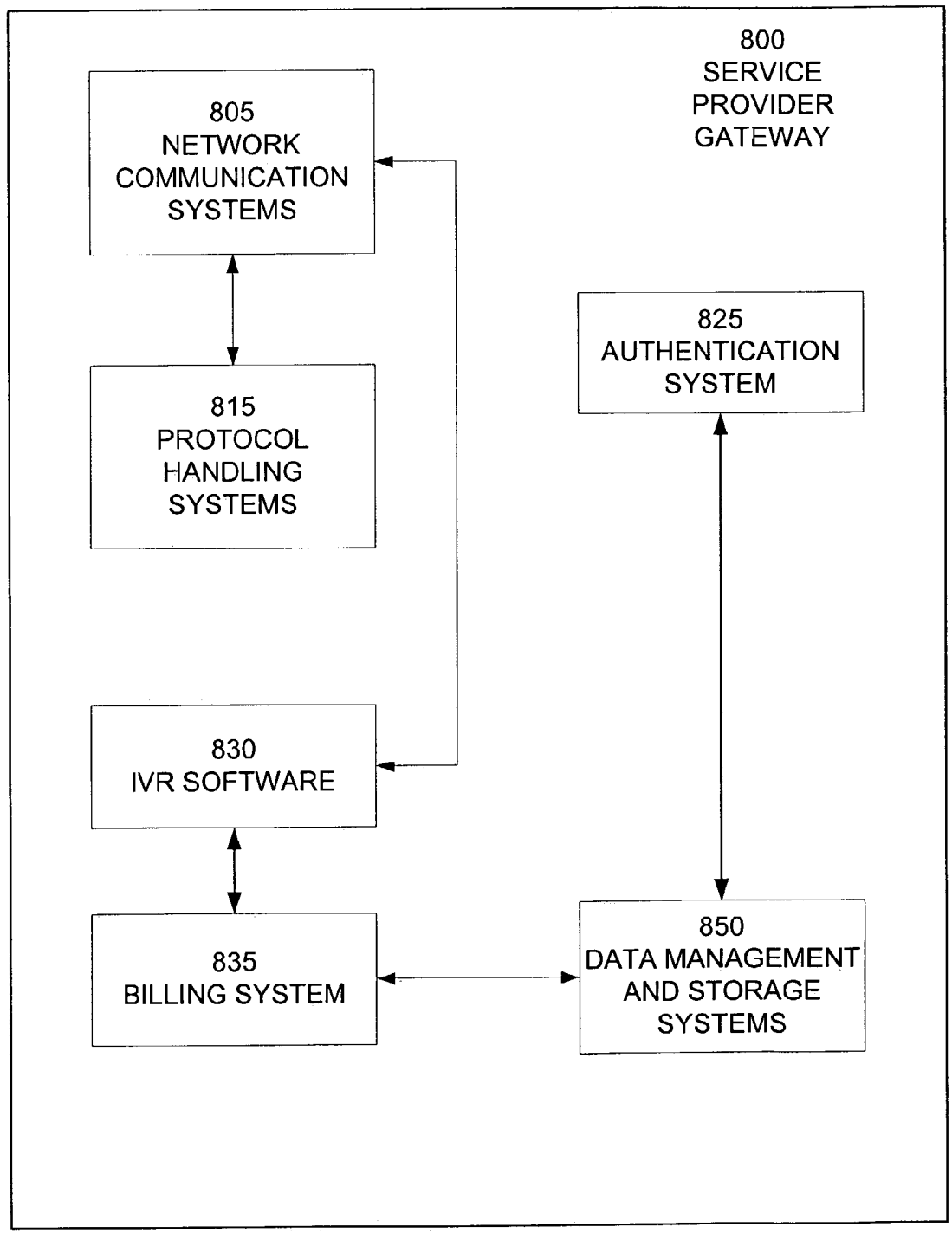
FIG. 8 illustrates a service provider gateway according to an embodiment of the present invention

In an embodiment of the present invention, a service provider gateway is a self-contained system for providing telephone communications using telephony gateways as embodied herein. FIG. 8 illustrates a service provider gateway according to an embodiment of the present invention.

Referring to FIG. 8, service provider gateway 800 comprises network systems 805 and protocol handling systems 815. These systems permit the service provider gateway to communicate with various networks using protocols required by the networks or required by the type of communication service being provided. Interactive voice response (IVR) software 830, in combination with billing system 835 and data management and storage systems 850 gather billing data and automate billing questions. Authentication of users is managed by authentication system 825.

In yet another embodiment of the present invention, a service provider gateway 800 according an embodiment of the present invention as described in reference to FIG. 8 is licensed for use by a third party service provider (TPSP). In one embodiment, the TPSP is permitted under the license to provide service to subscribers using a telephony gateway as described previously wherein the service is private labeled in the name of the TPSP. In an alternate embodiment, the TPSP acquires franchise rights to provide services to subscribers in the name of the licensor. In still another embodiment, the TPSP is permitted to offer access to a service provider network operated by the licensor in the name of the TPSP.

In yet another embodiment of the present invention, the telephony gateway is configured to receive communications from a remote location via a telephone call (either from the PSTN or a wireless service provider). The communications may be used to configure the gateway or to initiate a call from the gateway to a remote communication device. In this latter embodiment, the gateway additionally functions as a bridge between the incoming calling device and the remote communication device. The gateway answers the incoming calling, the CPE Control protocol accepts user input (e.g. a authentication PIN, star and target phone number: #65432*7771234567#) necessary to call the remote receiving device, and then places a VoIP call to the remote communication device.

In another embodiment of the present invention, two telephony gateways are connected to first and second communication devices respectively that are in communication with each other. The first communication device sends a "hook-flash" signal to the first telephony gateway. The first telephony gateway suspends the communication with the second telephony gateway and enables caller access to the CPE Control protocol. Using this protocol the user directs the CPE to initiate a three-way call to another phone. The CPE Control protocol will notify the CPE Control Protocol on the second device that a three-way call has been initiated. The three-way connection comprises sharing data from one party with the other two parties on the call. In this manner, a three-way connection is established and maintained without external mixing devices or the need to deploy a media gateway in the VoIP system.

A telephony gateway, CPE Control protocol and a telecommunication protocol engine and method have now been illustrated. As described herein, the telecommunication protocol engine and method results in significant reduction in on-chip memory requirements and permits the use of otherwise memory limited microprocessors. It will also be understood that the invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible.

What is claimed is:

1. A telephone gateway device comprising:
   a first memory device external to a processor, the first memory device storing one or more telecommunication protocol templates, each of the one or more telecommunication protocol templates including a plurality of virtual machine instructions to implement a telecommunication protocol using one or more finite state machines and template state data;
   a second memory device internal to the processor, the second memory device to store a state table of one or more finite state machines; and
   the processor having access to the first memory device, the second memory device and firmware, the firmware adapted to operate a virtual machine, and wherein the processor:
   causes the virtual machine to read first virtual machine instructions of a first telecommunication protocol template from the first memory device;
   executes the first virtual machine instructions to instantiate a first finite state machine and to store a first state table based on template state data associated with the first virtual machine instructions at the second memory device, wherein the first finite state machine and the first state table specify a first telecommunication protocol; and
   implements the first telecommunication protocol using the first state table and the first finite state machine.

2. The telephone gateway device of claim 1, wherein the first telecommunication protocol includes at least one of a Session Initiation Protocol (SIP), a H.323 protocol, a STUN protocol, and a Dynamic Host Configuration Protocol (DHCP).

3. The telephone gateway device of claim 1, further comprising an input/output (I/O) port, and wherein the processor:
   receives input via the I/O port;
   determines a transition of the first finite state machine based on the input and the first state table; and
   updates the first state table based on the transition.

4. The telephone gateway device of claim 1, wherein the first memory device further includes second virtual machine instructions selected from a second telecommunication protocol template to implement a second telecommunication protocol.

5. The telephone gateway device of claim 4, wherein the second telecommunication protocol includes at least one of a Session Initiation Protocol (SIP), a H.323 protocol, a STUN protocol, and a Dynamic Host Configuration Protocol (DHCP).

6. The telephone gateway device of claim 4, wherein the second telecommunication protocol template includes one or more second finite state machines.

7. The telephone gateway device of claim 1, wherein the processor is linked to the first memory device via a data bus.

8. The telephone gateway device of claim 7, wherein the data bus is a serial bus.

9. The telephone gateway device of claim 7, wherein the data bus is a parallel bus.

10. A method of implementing a telecommunication protocol, the method comprising:
    selecting a first telecommunication protocol template by a processor of a telephony gateway device, wherein the first telecommunication protocol template includes one or more virtual machine instructions executable by a virtual machine at the telephony gateway device to implement a first telecommunication protocol;
    reading a first virtual machine instruction of the first telecommunication protocol template from a first memory device, wherein the first memory device is coupled to the processor via a bus;
    initializing a first finite state machine using the first virtual machine instruction, wherein the first telecommunication protocol template includes first template state data defining a first template state of the first finite state machine;
    storing the first template state at a second memory device of the telephony gateway device in a first state table, wherein the second memory device is internal to the processor;
    receiving an input at the processor via a telephony call;
    determining, by the virtual machine, an updated template state of the first finite state machine based on the first state table and the input; and
    storing an updated first state table at the second memory device, the updated first state table specifying the updated template state.

11. The method of claim 10, wherein the first telecommunication protocol includes one of a Session Initiation Protocol (SIP), a H.323 protocol, a STUN protocol, and a dynamic host configuration protocol (DHCP).

12. The method of claim 10, wherein the first template state data identifies transitions of the first finite state machine.

13. The method of claim 10, further comprising:
    receiving a request at the processor to implement a second telecommunication protocol;
    reading a second virtual machine instruction from the first memory device;
    initializing a second finite state machine using the second virtual machine instruction; and
    storing a second template state of the second finite state machine at the second memory device in a second state table.

14. The method of claim 13, wherein the second telecommunication protocol includes one of a Session Initiation Protocol (SIP), a H.323 protocol, a STUN protocol, and a dynamic host configuration protocol (DHCP).

15. The method of claim 13, wherein the second template state is determined based on the first finite state machine.

16. The method of claim 13, further comprising determining a transition of the first finite state machine based on the second finite state machine.

17. The telephone gateway device of claim 1, wherein the first memory device has a larger storage capacity than the second memory device.

18. The telephone gateway device of claim 1, wherein the first memory device is a FLASH memory device.

19. The telephone gateway device of claim 18, wherein the second memory device is a RAM memory device.

20. The telephone gateway device of claim 4, wherein the processor:
    causes the virtual machine to read the second virtual machine instructions of the second telecommunication protocol template from the first memory device in response to a request to implement the second telecommunication protocol;
    executes the second virtual machine instructions to instantiate a second finite state machine and to store a second state table based on template state data associated with the second virtual machine instructions at the second memory device, wherein the second finite state machine and the second state table specify the second telecommunication protocol; and implements the second telecommunication protocol using the second state table and the second finite state machine.

21. A telephone gateway device, comprising:

a first memory device coupled to a processor by a bus, the first memory device storing one or more telecommunication protocol templates, each of the one or more telecommunication protocol templates including a plurality of virtual machine instructions to implement a telecommunication protocol using one or more finite state machines;

a second memory device integral with the processor, the second memory device to store state data related to the one or more finite state machines during implementation of the telecommunication protocol;

the processor having access to the first memory device and the second memory device, the processor configured to:

read first virtual machine instructions from the first memory device, the first virtual machine instructions selected from a first telecommunication protocol template to implement a first telecommunication protocol;

receive first template state data specifying an initial state of a first finite state machine; and execute the first virtual machine instructions using the first template state data to initialize the first finite state machine and to store an initial state table of the first finite state machine at the second memory device.

22. The method of claim 10, further comprising, in response to the input, sending a message to a called party, wherein the updated template state is determined based on a response to the message.

23. The method of claim 22, wherein, when no response to the message is received from the called party, the updated template state comprises a fast busy tone state.

24. The method of claim 22, wherein, when the response to the message indicates that the telephony call has been answered, the method further comprises executing an init vocoder instruction.

25. The method of claim 22, wherein, when the response to the message indicates that the telephony call has been answered, the updated template state comprises a voice state.

26. The telephone gateway device of claim 3, wherein the input is received via a call using the first telecommunication protocol.

* * * * *